US012742379B2

(12) United States Patent
Sharma et al.

(10) Patent No.: US 12,742,379 B2
(45) Date of Patent: Sep. 22, 2026

(54) INTEGRATING DOMAIN KNOWLEDGE WITH MACHINE LEARNING TO OPTIMIZE ELECTRICAL SUBMERSIBLE PUMP PERFORMANCE

(71) Applicant: Schlumberger Technology Corporation, Sugar Land, TX (US)

(72) Inventors: Abhishek Sharma, Richmond, TX (US); Praprut Songchitruksa, Houston, TX (US); Rajeev Ranjan Sinha, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 198 days.

(21) Appl. No.: 18/292,390

(22) PCT Filed: Jul. 28, 2022

(86) PCT No.: PCT/US2022/038701

§ 371 (c)(1),
(2) Date: Jan. 26, 2024

(87) PCT Pub. No.: WO2023/009741

PCT Pub. Date: Feb. 2, 2023

(65) Prior Publication Data

US 2024/0376813 A1 Nov. 14, 2024

Related U.S. Application Data

(60) Provisional application No. 63/262,928, filed on Oct. 22, 2021, provisional application No. 63/203,693, filed on Jul. 28, 2021.

(51) Int. Cl.
*E21B 47/008* (2012.01)
*E21B 43/12* (2006.01)
(Continued)

(52) U.S. Cl.
CPC ............ *E21B 47/008* (2020.05); *E21B 43/12* (2013.01); *E21B 43/128* (2013.01); *F04B 17/03* (2013.01);
(Continued)

(58) Field of Classification Search
CPC .. E21B 43/128; E21B 47/008; E21B 2200/22; E21B 2200/20; E21B 43/12;
(Continued)

(56) References Cited

U.S. PATENT DOCUMENTS 12,197,201 B2 * 1/2025 Boguslawski ..... G05B 23/0254
2005/0273296 A1 12/2005 Zhu et al.
(Continued)

FOREIGN PATENT DOCUMENTS

CN 111461551 A 7/2020
WO WO-2020206403 A1 * 10/2020 ......... G05B 23/0221
WO 2020236131 A1 11/2020

OTHER PUBLICATIONS

Carrillo , W., "Prognostics for Oil & Gas Artificial Lift Applications", GE Oil and Gas, PHM Conference, New Orleans, 2013, 15 pages.
(Continued)

*Primary Examiner* — Peter J Bertheaud
(74) *Attorney, Agent, or Firm* — Kyle R. Miiller

(57) ABSTRACT

A method for monitoring operation or status of an electrical submersible pump (ESP) is provided, which includes a) collecting historical time-series data related to ESP operation; b) extracting historical time-series data related to healthy ESP operation from the historical time-series data of a); c) extracting feature data from the historical time-series data extracted in b); d) extracting or calculating values of at least one key performance indicator (KPI) related to healthy ESP operation from the historical times-series data extracted
(Continued)

in b); c) using the feature data of c) and the values of at least one KPI of d) to train a machine learning (ML) model to predict at least one target KPI related to healthy ESP operation given feature data as input; and f) using the ML model trained in c) to monitor operation or status of the ESP. Other aspects are described and claimed.

25 Claims, 8 Drawing Sheets

(51) Int. Cl.

| | |
|---|---|
| ***F04B 17/03*** | (2006.01) |
| ***F04B 49/06*** | (2006.01) |
| ***F04B 49/20*** | (2006.01) |
| ***F04D 13/08*** | (2006.01) |
| ***F04D 13/10*** | (2006.01) |
| ***F04D 13/12*** | (2006.01) |
| ***F04D 15/00*** | (2006.01) |
| ***G06N 20/00*** | (2019.01) |

(52) U.S. Cl.

CPC ............ *F04B 49/065* (2013.01); *F04B 49/20* (2013.01); *F04D 13/08* (2013.01); *F04D 13/086* (2013.01); *F04D 13/10* (2013.01); *F04D 13/12* (2013.01); *F04D 15/00* (2013.01); *F04D 15/0066* (2013.01); *F04D 15/0077* (2013.01); *F04D 15/0088* (2013.01); *G06N 20/00* (2019.01); *E21B 2200/20* (2020.05); *E21B 2200/22* (2020.05); *F04B 2205/09* (2013.01)

(58) Field of Classification Search

CPC .. F04D 15/0088; F04D 13/10; F04D 15/0066; F04D 13/12; F04D 15/00; F04D 13/08; F04D 13/086; F04D 15/0077; F04B 49/065; F04B 2205/09; F04B 49/20; F04B 17/03; G06N 20/00

See application file for complete search history.

(56) References Cited

U.S. PATENT DOCUMENTS

| | | | | |
|---|---|---|---|---|
| 2017/0292513 | A1 | 10/2017 | Haddad | |
| 2019/0287005 | A1* | 9/2019 | Subramaniyan ......... | G06N 5/04 |
| 2020/0325766 | A1 | 10/2020 | Gupta | |
| 2021/0071509 | A1 | 3/2021 | Beck et al. | |
| 2021/0087925 | A1 | 3/2021 | Heidari et al. | |

OTHER PUBLICATIONS

Camilleri, L., et al."How 24/7 Real-Time Surveillance Increases ESP Run Life and Uptime", SPE Annual Technical Conference and Exhibition, SPE-134702-MS, Sep. 19, 2010.

Stone, P., Introducing Predictive Analytics: Opportunities. SPE paper 106865 presented at SPE Digital Energy Conference and Exhibition, SPE-106865-MS, Apr. 11, 2007.

Search Report and Written Opinion of International Patent Application No. PCT/US2022/038701 Dated Nov. 4, 2022, 11 Pages.

Kingsley, E., IBM. Predictive Asset Maintenance, SPE paper 150234 presented at SPE Intelligent Energy International, Utrecht, the Netherlands, Mar. 27-29, 2012.

Guo, D., et al., "Data Driven Approach to Failure Prediction for Electrical Submersible Pump Systems", SPE Western Regional Meeting, SPE-174062-MS, Apr. 27, 2015.

Gupta, S., et al., "ESP Health Monitoring KPI: A Real-Time Predictive Analytics Application", SPE Intelligent Energy International Conference and Exhibition, SPE-181009-MS, Sep. 6, 2016.

Gartner IT Glossary, URL: https://www.gartner.com/en/information-technology/glossary, 4 pages.

* cited by examiner

Identify Health Signals

- Domain knowledge
- Exploratory statistical analysis (e.g., PCA, Parallel Coordinates, KNN)

Identify Features

- Feature engineering
- Feature selection

Build "Normal" Model

- Statistical models (e.g., logistic, softmax)
- TraditionalML (e.g., RF, GBM)
- Advanced ML (e.g., DNN, RBM)

Test Model

- Residual = Observed - Predicted
- Benchmark health signal performance (Precision/Recall Curve, TPR, FPR, F1 Score)
- Tune thresholds
- Address alarm shatters (e.g., EWMA, integrated residuals)

Fusing Health Signals

- If data permits, use a second model to capture multiple health signals
- Minimize FPR and maximize TPR
- Provide the first step of the diagnostic stage

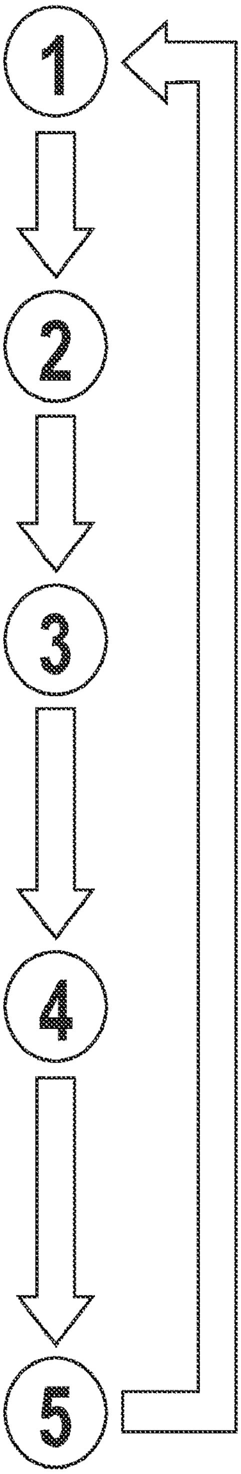

FIG. 2

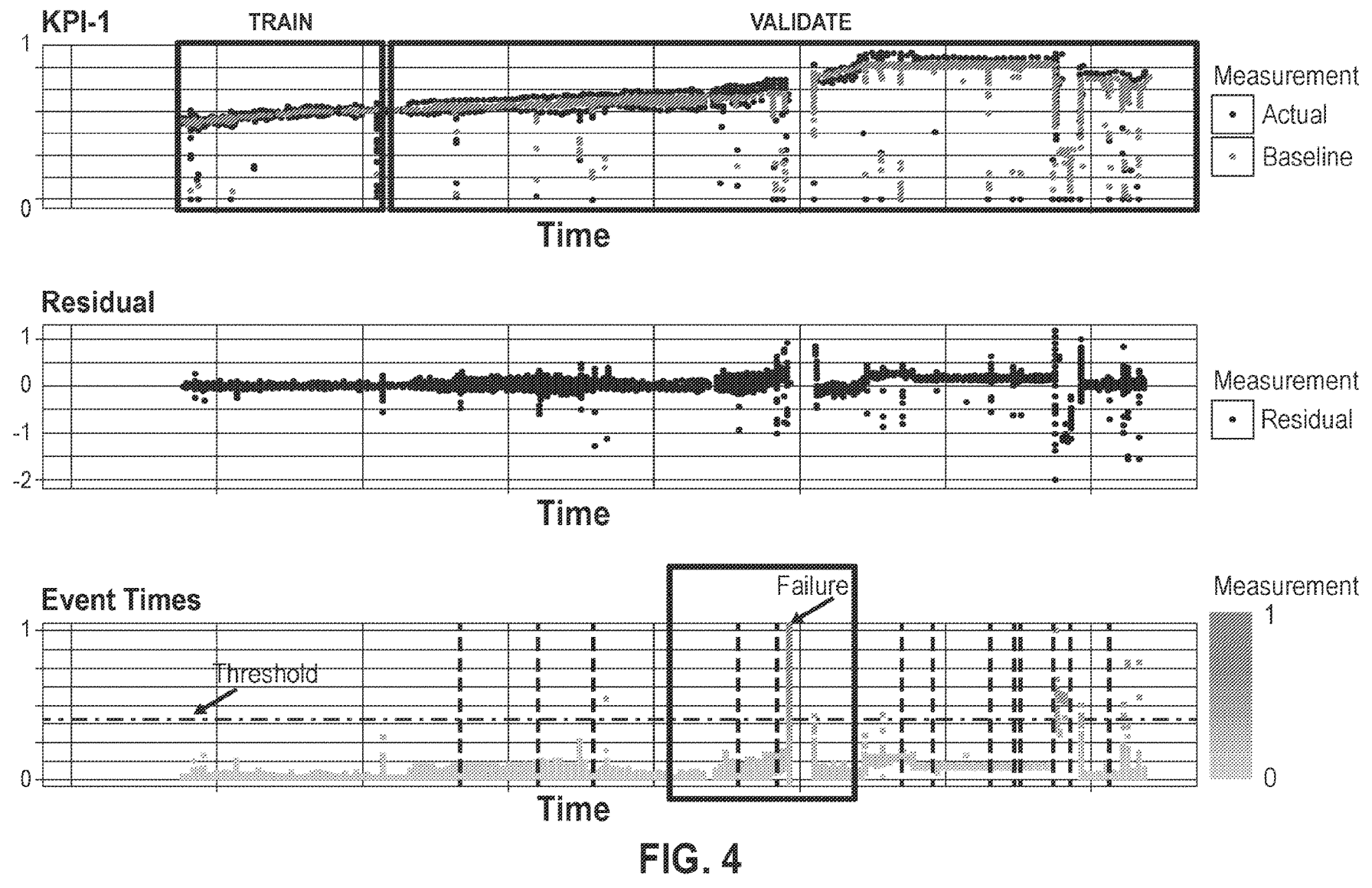

KPI-1

TRAIN

VALIDATE

Measurement
Actual
Baseline

Time

Residual

Measurement
Residual

Time

Event Times

Measurement
1
0

Threshold

Failure

Time

FIG. 4

Effects of Thresholds on Anomaly Detection Performance Using Normalized Values for KPI-1

| Threshold | TPR | FPR | F1 |
|---|---|---|---|
| 0.1 | 0.880 | 0.466 | 0.665 |
| 0.2 | 0.760 | 0.280 | 0.739 |
| 0.3 | 0.640 | 0.217 | 0.704 |
| 0.4 | 0.640 | 0.190 | 0.715 |
| 0.5 | 0.640 | 0.180 | 0.719 |
| 0.6 | 0.600 | 0.174 | 0.695 |
| 0.7 | 0.600 | 0.170 | 0.697 |
| 0.8 | 0.600 | 0.164 | 0.699 |
| 0.9 | 0.600 | 0.159 | 0.700 |
| 1 | 0.600 | 0.123 | 0.713 |

FIG. 5

Effects of Multiple KPIs on Anomaly Detection Performance

| Signal 1 | Signal 2 | TPR | FPR | F1 |
|---|---|---|---|---|
| 6 | 400 | 0.800 | 0.239 | 0.780 |
| 9 | 400 | 0.800 | 0.215 | 0.793 |
| 12 | 400 | 0.800 | 0.201 | 0.799 |
| 15 | 400 | 0.800 | 0.194 | 0.803 |
| 6 | 600 | 0.800 | 0.234 | 0.783 |
| 9 | 600 | 0.800 | 0.206 | 0.797 |
| 12 | 600 | 0.760 | 0.191 | 0.784 |
| 15 | 600 | 0.760 | 0.182 | 0.788 |
| 6 | 800 | 0.800 | 0.232 | 0.784 |
| 9 | 800 | 0.800 | 0.202 | 0.799 |
| 12 | 800 | 0.760 | 0.187 | 0.786 |
| 15 | 800 | 0.760 | 0.177 | 0.790 |
| 6 | 1000 | 0.800 | 0.231 | 0.784 |
| 9 | 1000 | 0.800 | 0.201 | 0.799 |
| 12 | 1000 | 0.760 | 0.184 | 0.787 |
| 15 | 1000 | 0.760 | 0.174 | 0.791 |

FIG. 6

INTEGRATING DOMAIN KNOWLEDGE WITH MACHINE LEARNING TO OPTIMIZE ELECTRICAL SUBMERSIBLE PUMP PERFORMANCE

CROSS-REFERENCE TO RELATED APPLICATION(S)

The present application is a National Stage entry of International Patent Application No. PCT/US2022/038701, filed on Jul. 28, 2022, which claims priority to U.S. Patent Application No. 63/203,693, filed on Jul. 28, 2021, and U.S. Patent Application No. 63/262,928, filed on Oct. 22, 2021, all of which are incorporated by reference herein.

FIELD

The subject disclosure relates to optimizing the performance of electrical submersible pumps.

BACKGROUND

Electrical Submersible Pumps ("ESPs") are the predominant lift method used in many oil and gas fields. ESPs are often operated in harsh environments and under tough operating conditions, which can accelerate aging and degrade performance. Many operators augment ESPs with high-frequency (HF) sensors to monitor their performance but much of this information remains either unused or partially used. Therefore, a significant need exists in the art for a more automated and efficient process for monitoring ESP performance.

SUMMARY

The present disclosure relates to methods for monitoring operation or status of an electrical submersible pump (ESP). The method includes a) collecting historical time-series data related to ESP operation; b) extracting historical time-series data related to healthy ESP operation from the historical time-series data of a); c) extracting feature data from the historical time-series data extracted in b); d) extracting or calculating values of at least one key performance indicator (KPI) related to healthy ESP operation from the historical times-series data extracted in b); e) using the feature data of c) and the values of at least one KPI of d) to train a machine learning (ML) model to predict at least one target KPI related to healthy ESP operation given feature data as input; and f) using the ML model trained in e) to monitor operation or status of the ESP.

In embodiments, the use of the trained ML model in monitoring operation or status of the ESP can involve i) receiving or collecting real-time time-series operational data related to operation of the ESP; ii) extracting feature data from the real-time time-series operational data of i); iii) using the ML model trained in e) to predict the at least one target KPI related to healthy ESP operation given the feature data extracted in ii); iv) extracting or calculating values of at least one observed KPI from the real-time time-series operational data of i); v) calculating at least one residual based on the difference between the at least one observed KPI and corresponding target KPI predicted by the ML model; and vi) evaluating the at least one residual to detect an event related to the operation of the ESP.

In embodiments, the values of at least one KPI of d) can relate to particular channels in the historical time-series data extracted in b) or calculated variables derived from such data or a combination of both, and the values of the at least one observed KPI of iv) can relate to particular channels in the real-time time-series operation data of i) or calculated variables derived from such data or a combination of both.

In embodiments, the feature data of c) can capture temporal characteristics of the historical time-series data extracted in b), and the feature data of ii) can capture temporal characteristics of the real-time time-series operational data of i).

In embodiments, the feature data of c) can be derived by calculating statistics of the historical time-series data extracted in b) within sliding time windows, and the feature data of ii) can be derived by calculating statistics of the real-time time-series operational data of i) within sliding time windows.

In embodiments, the at least one residual of v) can infer an anomaly in the operation or status of an ESP that leads to ESP failure or other operational event to support predictive anomaly detection for the ESP.

In embodiments, the ML learning model can be trained to predict a plurality of target KPIs related to healthy ESP operation given feature data as input.

In embodiments, the method can further involve calculating a plurality of residuals based on the differences between a plurality of observed KPIs and the plurality of target KPIs predicted by the trained ML model, wherein the plurality of residuals can infer an anomaly in the operation or status of an ESP that leads to ESP failure or other operational event to support predictive anomaly detection for the ESP.

In embodiments, two or more target KPIs predicted by the trained ML model can be fused together for anomaly detection.

In embodiments, the method can employ at least one threshold value for evaluating the at least one residual.

In embodiments, the method can further involve repeating the operations of d) and e) in an iterative fashion to update KPIs or other system parameters and generate the ML learning model.

In embodiments, the method can further involve alerting a user of the event detected in vi). For example, the alert can be communicated visually to the user.

In embodiments, the method can further involve deploying or installing the trained ML model on a cloud computing environment that communicates with a gateway located at or near a wellsite, wherein the gateway is configured to collect real-time operational data related to operation of at least one ESP located at the wellsite and to forward the real-time operational data to the cloud computing environment.

In other embodiments, the method can further involve deploying or installing the trained ML model trained on a gateway located at or near a wellsite, wherein the gateway is configured to collect real-time operational data related to operation of at least one ESP located at the wellsite.

In embodiments, some or all of the operations of the method can be performed by at least one processor.

In another aspect, a system for monitoring operation or status of an electrical submersible pump (ESP) can include at least one processor configured to perform some or all of the operations of the workflows as described and claimed herein.

In still another aspect, a system for monitoring operation or status of an electrical submersible pump (ESP) located at a wellsite can include at least one sensor located at the wellsite, wherein the at least one sensor is configured to measure data related to operation of the ESP. A gateway device is located at or near the wellsite, wherein the gateway device is operably coupled to the at least one sensor, wherein the gateway device is configured to generate or collect or obtain time-series operational data from the data measured by the at least one sensor. The gateway device or a remote system operably coupled to the gateway device can be configured to perform operations that characterize operation of the ESP, wherein the operations involve: (i) receiving or collecting real-time time-series operational data related to operation of the ESP; (ii) extracting feature data from the real-time time-series operational data of i); (iii) using the ML model trained according to the workflows as described and claimed herein to predict at least one target KPI related to healthy ESP operation given the feature data extracted in ii); (iv) extracting or calculating values of at least one observed KPI from the real-time time-series operational data of i); (v) calculating at least one residual based on the difference between the at least one observed KPI and corresponding target KPI predicted by the ML model; and (vi) evaluating the at least one residual to detect an event related to the operation of the ESP.

In embodiments, the remote system can be configured to alert a user of the event detected in vi).

In embodiments, the remote system can be embodied by a cloud computing environment.

In embodiments, the remote system can include a processor programmed by at least one software application.

In embodiments, the gateway device can include a processor programmed by at least one software application.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 2 is a schematic diagram of an embodiment of a workflow for training and testing a ML model that predicts at least one KPI related to the operational status or condition of at least one ESP, where the at least one KPI is used to monitor operation or status of at least one ESP;

FIG. 4 includes a number of plots illustrating results generated by a ML model trained according to the workflow of FIG. 2 for a designated KPI;

FIG. 5 is a table that illustrates the effects of varying the threshold for KPI-1 used in the anomaly detection method on true-positive rates (TPR) and false-positive rates (FPR);

FIG. 6 is a table that shows an example of the anomaly detection performance using two KPI signals instead of a single KPI;

DETAILED DESCRIPTION

Figure 1:
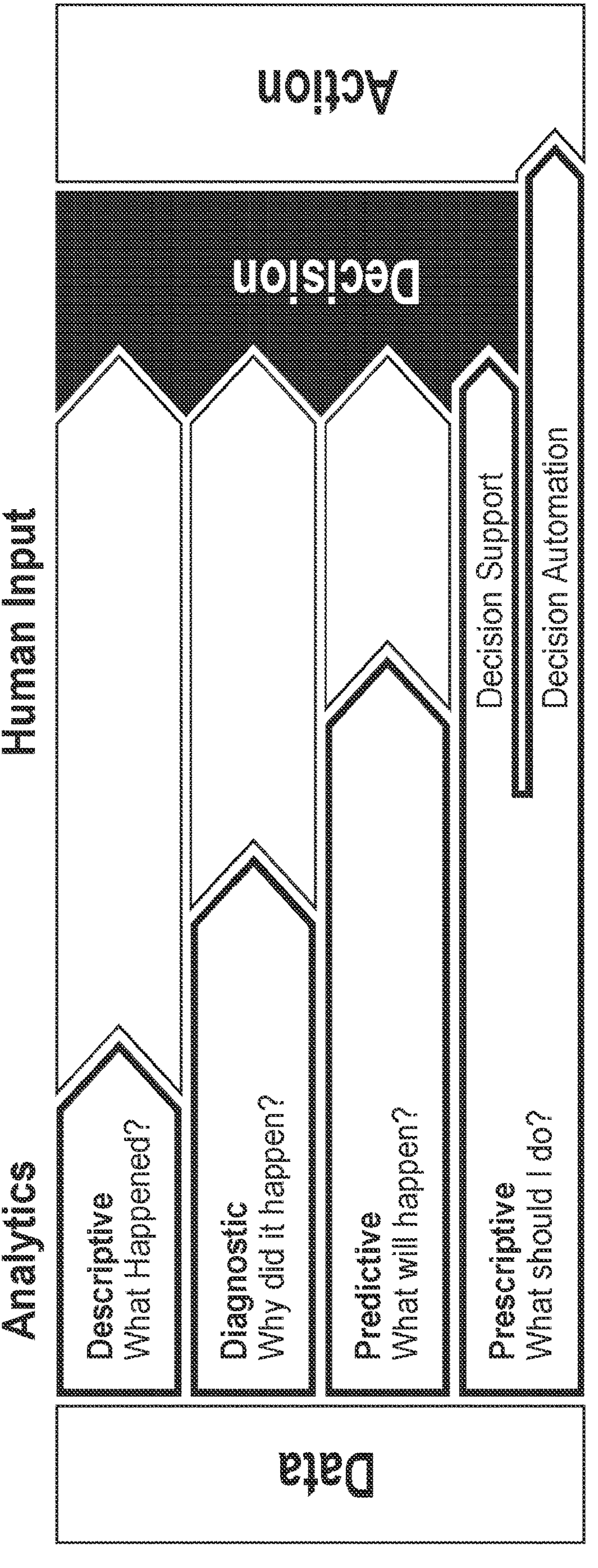
FIG. 1 is a schematic diagram that depicts a definition of big data analytics.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc., may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects, or steps, respectively, but they are not to be considered the same object or step.

The terminology used in this disclosure is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

ESPs are used in low-energy reservoirs as means of artificial lift. Over time, advances in ESP technology have resulted in higher reliability, performance, and endurance in production operations. A digital push to augment ESPs with sensors has enabled tracking of the performance in an improved manner. More operators are now using real-time sensor information to make decisions to improve ESP efficiency and run life. However, challenges remain. Typically, running costs are high and could well run into millions of dollars when accounted for ESP failure and pullouts and associated production loss (See Carrillo, W., GE Oil and Gas. Prognostics for Oil & Gas Artificial Lift Applications. GE Oil and Gas, PHM Conference, New Orleans, 2013).

An ESP includes surface equipment and downhole equipment that have many moving parts and require careful and exhaustive monitoring. There are many factors that can affect ESP performance, including i) reservoir issues such as high amount of gas, sand, high temperature etc.; ii) electrical issues such as high voltage/current, severe weather; and iii) mechanical issues related to vibration and pump degradation. Typically, an operator tracks one or more operational parameters of the equipment to identify the above issues. Most of the analysis is done post-failure and pullout so downtime and limited proactive management remains an issue.

Operators have started to consider downhole sensor data to identify potential issues and deviation in ESP operational characteristics. Tracking and recognizing these issues early, results in actions which can improve pump performance and run life. Some of the commonly installed sensors track motor temperature, current leakage, intake and discharge pressure and vibration data. Based on the field and operations characteristics, ranges of each of these high-frequency parameters are set and monitored. Whenever, one or more parameters reach a certain threshold, alarms are generated. Alarms are prioritized depending on the severity. When following this approach, the workflow can generate a large number of alarms and it becomes extremely difficult for the surveillance engineer to classify and prioritize various issues. Many of these could be non-threatening so identifying the critical alarms and issues remains challenging.

Capturing expert analysis is essential to pinpoint the critical behavior signatures and identify causes of ESP failures. A comprehensive and reliable analysis and thorough review of ESP's production history and well-performance data is required to identify root causes and follow up actions to generate value (Camilleri, L.; MacDonald, J., Schlumberger. How 24/7 Real-Time Surveillance Increases ESP Run Life and Uptime. SPE paper 134702 presented at Annual Technical Conference and Exhibition, Florence, Italy, 19-22 Sep. 2010.).

Data Analytics in ESP Operation

Following the definition of big data analytics from the Gartner IT Glossary, 2018 as shown in FIG. 1, data analytics can be divided into two main blocks: a basic block and an advanced block. The basic block includes descriptive and diagnostic analytics. These are the traditional business intelligence (dashboard) deployments that collect and report data in an organized manner. Business Intelligence focuses on reporting what happened (descriptive analytics). Based on the available data, diagnostic analytics can be used to perform root cause analysis of various events. The advanced block includes predictive and prescriptive analytics, which employ autonomous or semi-autonomous examination of data or content using sophisticated techniques and tools, typically beyond those of traditional business intelligence (BI), to discover deeper insights, make predictions, or generate recommendations. The predictive and prescriptive analytics include data/text mining, machine learning, pattern matching, forecasting, visualization, semantic analysis, sentiment analysis, network and cluster analysis, multivariate statistics, graph analysis, simulation, complex event processing, neural networks.

The current climate in the oilfield industry requires innovation. A producer with lower lifting costs has better chances of surviving and thriving. This is where advanced machine learning concepts such as predictive analytics can play a major role. These techniques can mine the huge datasets collected over years and provide insights which can drive improvement in efficiency and performance in field operations and maintenance. With computing power available at low costs, many companies have started exploring potential use cases in equipment maintenance.

Stone (2007) has summarized a few use cases where predictive analytics could be leveraged. The author states that lower computing costs along with software development with better user experience and integration of mathematical algorithms have brought data mining into mainstream in the industry. He further explores use cases around equipment health monitoring which can avoid downtime and reduce maintenance costs. See Stone, P., BP. Introducing Predictive Analytics: Opportunities. SPE paper 106865 presented at SPE Digital Energy Conference and Exhibition, Houston, Texas, 11-12 Apr. 2007.

Kingsley (2012) describes predictive asset maintenance and tries to make a case that it can accurately predict equipment characteristics and unearth patterns in maintenance operations over time that could lead to reduced expenses and downtime. See Kingsley, E., IBM. Predictive Asset Maintenance. SPE paper 150234 presented at SPE Intelligent Energy International, Utrecht, the Netherlands, 27-29 Mar. 2012.

Recently, Guo et al. (2015) and Gupta et al. (2016) have presented data driven approaches looking into ESP failure prediction and health monitoring. These studies show use and advantage of machine learning in ESP failure prediction and preventive maintenance. See Guo, D. and Raghvendra, C. S., USC; Yao, K., USC ISI; Harding, M., Anvar, A. and Patel, A.; Chevron USA Inc. Data Driven Approach to Failure Prediction for Electrical Submersible Pump Systems. SPE paper 174062 presented at SPE Western Regional Meeting, Garden Grove, California, 27-30 Apr. 2015 and Gupta, S. and Saputelli, L., Frontender Corporation; Nikolaou, M., University of Houston; Bravo, C., Halliburton. ESP Health Monitoring KPI: A Real-Time Predictive Analytics Application. SPE paper 181009 presented at SPE intelligent Energy International Conference and Exhibition held in Aberdeen, United Kingdom, 6-8 Sep. 2016.

Data-Driven Workflow for Anomaly Detection of ESP

The present disclosure describes a data-driven workflow that monitors the operational performance and health of one or more ESPs using anomaly detection methodology with high-frequency sensor data. This can help maximize the run life of the one or more ESPs while reducing the cost of maintenance. The current/traditional approach to ESP maintenance has been to generate alarms based on thresholds on parameters and rule-based logics to determine potential anomalies. The workflow of the present disclosure enhances the understanding of ESP operational behavior by utilizing advanced machine learning models. The workflow contrasts with conventional field maintenance which is often reactive and incurs additional downtime in logistics and inventory management in diagnosing the issues and in taking the recommended actions. In contrast, using machine learning concepts can save operating costs, especially in case of the ESPs widely used for artificial lift in oilfield applications.

Many operators augment ESPs with high-frequency (HF) sensors to monitor their performance but much of this information remains either unused or partially used. The application of machine learning (ML) concepts in understanding ESP operational behavior complements the existing domain practice.

The workflow of the present disclosure begins with domain knowledge and exploratory statistical analysis to identify key performance indicators (KPIs) that relate to ESP operational state or condition for both healthy ESP operation and unhealthy ESP operation that leads to failure. The KPIs can be particular channels within time-series operational data streams for an ESP or calculated variables or parameters derived from these measures or a combination of both. In embodiments, the KPIs can represent time-series data or signals that experience a statistically significant change between healthy ESP operation and unhealthy ESP operation that leads to failure. Feature engineering can be used to identify features within the time-series operational data streams for an ESP where such features capture temporal characteristics of the time-series operational data. Advanced ML techniques can be utilized to build and train a ML model that predicts the KPIs (pr KPI values) for healthy (or normal) ESP operation (referred to herein as "target KPIs") based on feature data extracted from time-series operational data for an ESP.

Once the ML model is trained, real-time high-frequency time-series operational data of an ESP operating in a well can be received and/or collected, feature data can be extracted from the time-series operational data, and the feature data can be input to the trained ML model to generate the target KPIs for healthy (or normal) ESP operation. Corresponding KPI values (referred to herein as observed KPIs) can be extracted or calculated from the time-series operational data. The differences (or residuals) between the observed KPIs and the corresponding target KPIs generated by the trained ML model can be stored or logged for predictive anomaly detection. The goal of predictive anomaly detection is to detect an anomaly in the operation of the ESP in advance of failure of the ESP. In some embodiments, one or more observed KPIs and the corresponding target KPIs can be fused together or combined for the predictive anomaly detection.

In a test of the workflow, the ML model was trained on the data from a group of active producing wells with reported historical events, failures, and pullout reports. The data contained several well events and several reported failures. This information was used to fine-tune the thresholds for the anomaly detection method. The workflow detected approximately 70% of failure events (true positive rate) in the data set. The false alarm rate for the workflow was approximately 20% (false positive rate).

In embodiments, the result of the anomaly detection can be used to generate an "anomaly" alarm event that is conveyed to the operator of the ESP, for example as part of a message or visual dashboard. The visual dashboard can depict the observed KPIs of the ESP over time, the residuals based on the differences between the observed KPIs and target KPIs over time, an indication of the "anomaly" alarm event, or other data derived therefrom. In the case of multiple "anomaly" alarm events, the alarms can be prioritized based on the failure probability and remaining useful life of the ESP.

In embodiments, the health signal degradation patterns represented by the observed KPIs of the ESP over time (or by the residuals or differences between the observed KPIs and target KPIs over time) can be captured and learned to predict the remaining useful life of the ESPs, thus enabling operators to allocate and prioritize maintenance resources. In addition, the analysis of ESP pullout reports can provide insight into the relationship between the KPIs and root causes of ESP failure, which can be structured into a formal Bayesian network to provide automatic failure root cause interpretation.

The data-driven approach can take advantage of the vast amount of reservoir, production, and facilities data and provides insights into nonlinear multidimensional relationships between parameters to better understand and optimize field development and to adopt a proactive approach toward equipment maintenance.

The objective of the ML model of the workflow is to detect anomalies in ESP operation before failure. This class of problem is referred to herein as "anomaly detection," where the ML model is trained to predict ESP health signals or KPIs for healthy ESP operation and then use the learned ML model to monitor incoming new data. The magnitude of the differences between the predicted KPIs generated by the ML model versus KPIs extracted or calculated from the new data defines the level of abnormality observed.

FIG. 2 summarizes an embodiment of the workflowwith five steps as follows.

Step 1 involves the identification of KPIs that can be extracted or calculated from time-series operational data of an ESP where the KPIs relate to ESP operational state or condition for both healthy ESP operation and unhealthy ESP operation that leads to failure. The KPIs can be particular channels within time-series operational data streams for an ESP or calculated variables or parameters derived from these measures or a combination of both. In embodiments, the KPIs can represent time-series data or signals that experience a statistically significant change between healthy ESP operation and unhealthy ESP operation that leads to failure. This step can involve consultation with a relevant operator entity (e.g., SME) to identify potential KPIs. In cases where SMEs are unavailable, an exploratory data-driven approach may be used to find promising KPIs. This approach generally falls into the class of unsupervised clustering algorithms.

Step 2 involves feature engineering where the time-series operational data for one or more ESPs is collected and analyzed to identify features within the time-series operational data that capture temporal characteristics of time-series operational data. In embodiments, sliding windows can be used to calculate statistics (e.g., mean, standard deviation, rates) for each channel over time and these statistics can be used as features within the time-series operational data as part of the workflow.

Step 3 involves building and training a ML model to predict KPI values (which correspond to the KPIs of step 1) expected under healthy ESP operation from feature data (which corresponds to the features of step 2) extracted from time-series operational data of an ESP. The KPI values predicted by the trained ML model are referred to as target KPIs herein. When the ESP is operating in a normal or healthy condition, the target KPIs should be close to the corresponding observed KPIs extracted or calculated from the time-series operational data of the ESP. The observed KPIs also correspond to the KPIs of step 1. Residuals can be calculated based on the differences between the observed KPIs and the corresponding target KPIs. The magnitude of residuals can be stored and evaluated to detect "anomaly" events. Various ML algorithms can be used to train the ML model in this step. In embodiments, the ML model can include one or more artificial neural network models, one or more random forest models, or one or more other suitable decision tree models. In embodiments, the ML model can include a number of ML systems (e.g., a number of artificial neural networks, random forest decision trees, or other suitable decision trees) corresponding to the KPIs of step 1, where each ML system is configured to predict a value for the corresponding target KPI.

Step 4 involves testing the trained ML model. Once the ML model is trained, historical high-frequency time-series operational data for one or more ESPs can be collected from a database, feature data (which corresponds to the features of step 2) can be extracted from the collected time-series data, and the feature data can be input to the trained ML model to generate the values for target KPIs. Corresponding observed KPIs can be extracted from the collected time-series data. The differences (or residuals) between the observed KPIs and the corresponding target KPIs generated by trained ML model can be logged for predictive anomaly detection. In embodiments, the predictive anomaly detection involves evaluating the differences (or residuals) between the target KPIs and the corresponding observed KPIs against predefined thresholds to detect an anomaly in the operation of the ESP. In this case, one or more observation windows of a predefined time period (e.g., a fixed number of days or hours) prior to ESP failure can be defined. One or more observation windows that precede one or more other types of operational events that can affect ESP operating conditions (e.g., electrical issues, gas coning, preventive maintenance) can also be defined. If the differences or residuals exceed specified thresholds within a defined observation window, then the anomaly is considered "detected"; otherwise the anomaly is considered "not-detected." The thresholds can be varied to calculate the true-positive and false-positive rates of anomaly detection. The true-positive rates correspond to the case where an anomaly event is detected within an observation window. The false-positive rates correspond to the case where an anomaly event is detected outside all observation windows. These rates can be used to set the thresholds to achieve desired detection characteristics of the workflow. The testing of step 4 can employ historical high-frequency time-series operational data from multiple ESPs operating in different wells.

In optional step 5, one or more target KPIs and corresponding observed KPIs can be fused together or combined for the predictive anomaly detection. This step can be designed to fuse multiple KPIs and tune the thresholds for each KPI respectively in order to improve the overall performance of the predictive anomaly detection provided by the workflow.

The workflow can repeat steps 1 to 5 in an iterative manner. Once a potential KPI is selected, a ML system that predicts the value of the potential KPI can be trained, tuned, and evaluated for its performance. If the predictive power of the ML system for the potential KPI is acceptable, then the ML system can be added or integrated into the ML model for the set of KPIs for the predictive anomaly detection. The process of finding the right set of KPIs and the ML model for the set of KPIs repeats until the desirable characteristics of the anomaly detection system is achieved.

Figure 3:
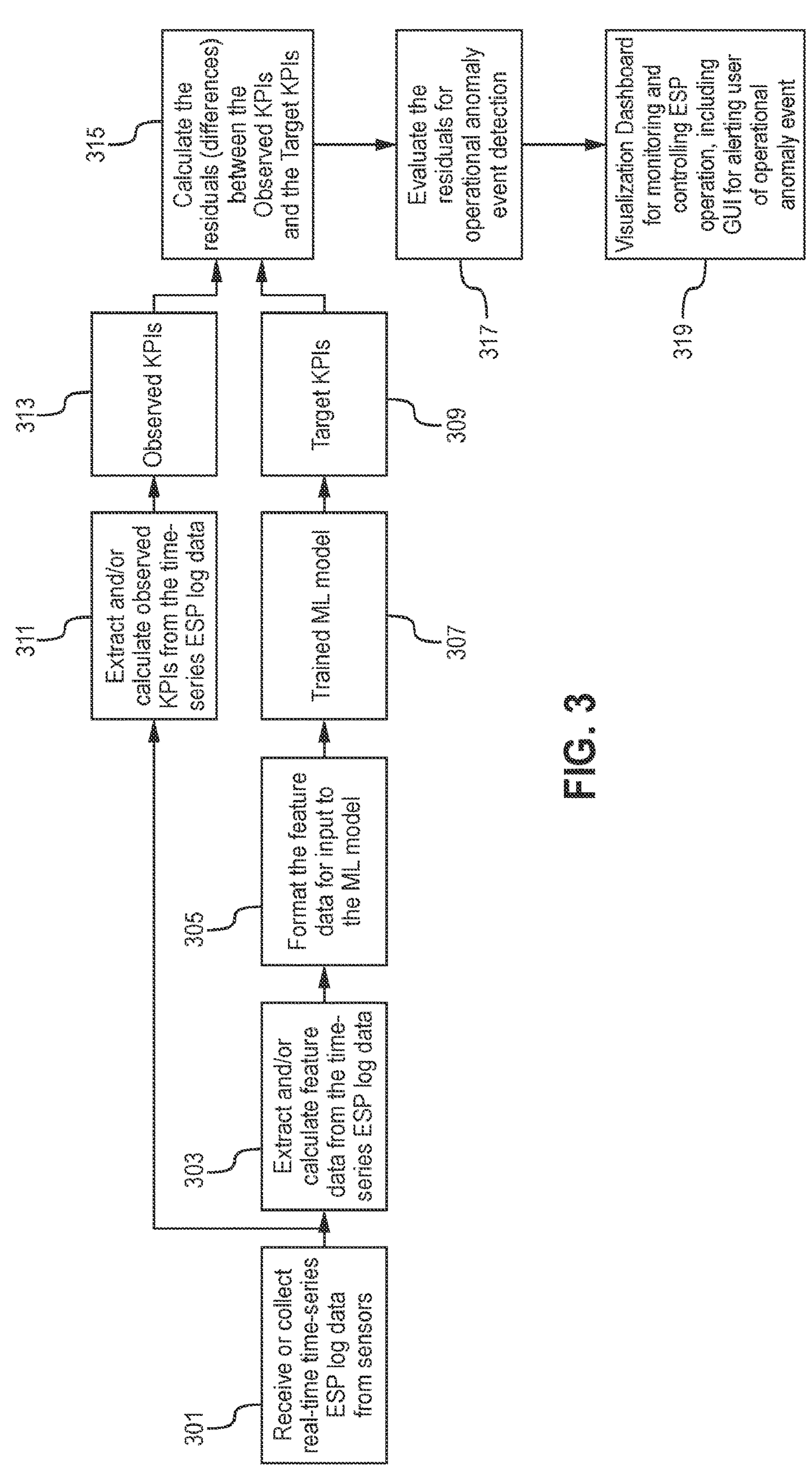
FIG. 3 is a flow chart depicting an embodiment of a workflow that uses the ML model trained according to the workflow of FIG. 2 in order to monitor operation or status of at least one ESP.

Once the ML model for the set of KPIs is trained, the trained ML model can be deployed to monitor the operation of one or more ESPs and detect anomaly events in the operation of the one or more ESPs as illustrated in FIG. 3. In this deployed phase, real-time high-frequency time-series operational log data of an ESP operating in a well can be received or collected (block 301), and feature data can be extracted or calculated from the time-series operational data (block 303). The feature data is formatted for input to the trained machine learning model (block 305) and run through the trained ML model (block 307) to generate the values for the target KPIs (block 309). Corresponding observed KPIs can be extracted or calculated from the collected time-series ESP log data (block 311). The differences (or residuals) between the observed KPIs and the corresponding target KPIs generated by trained ML model can be calculated and logged (block 315) for predictive anomaly detection (block 317). In embodiments, the predictive anomaly detection involves evaluating the differences (or residuals) between the observed KPIs and the corresponding target KPIs against predefined thresholds to detect an anomaly in the operation of the ESP. This processing of blocks 301 to 317 can be repeated using real-time high-frequency time-series operational log data of multiple ESPs operating in different wells to detect anomaly events in the operation of each ESP of the multiple ESPs.

In embodiments, the result of the anomaly detection can be used to generate an "anomaly" alarm event that is conveyed to the operator (e.g., surveillance engineer) of the ESP, for example as part of a message or visual dashboard that enables the operator to monitor and control the operation of the ESP (block 319). The visual dashboard of block 319 can depict the observed KPIs of the ESP over time, the residuals based on differences between the observed KPIs and target KPIs over time, an indication of the "anomaly" alarm event, or other data derived therefrom. In the case of multiple "anomaly" alarm events, the alarms can be prioritized based on the failure probability and remaining useful life of the ESP.

A study was conducted to evaluate the workflow of FIGS. 2 and 3. A brown oil field was chosen for the study. Many of the wells in the brown oilfield used ESPs for artificial lift and were completed with suitable downhole sensors. The challenges in monitoring ESP operations include: amount of downtime in case of an ESP failure is high and contributes to production loss due to lack of proactive management; inventory management is a big issue since there is not much control on frequency and timing of ESP pullouts; planning and implementing a workover takes a lot of time since there is little information before the ESP failure happens.

The undergoing digital push in the field has allowed tracking and monitoring ESP surface and downhole data. The installed sensors capture several high-frequency measurements tracking the ESP performance. Based on the data and frequency coverage, fifteen parameters were available to explore ESP diagnostics and failure analysis. These contain information about the following ESP attributes: surface measurement, such as variable speed drive frequency, current, voltage, etc. downhole measurements, such as intake pressure, discharge pressure, motor temperature, current, vibration, etc.

The available ESP pull reports provide information on ESP failures and expert comments on the reasons behind the pulling. A log report captures any significant events/interferences during the operation of ESPs. The objective here is to minimize the downtime and production losses by providing early indication of ESP anomalies that lead to failure.

First, a data set used to build the anomaly detection workflow is collected from a database of ESP data logs acquired from active producing wells. In the representative example, the ESP data logs can include fifteen channels with frequencies of logging ranging from 1 minute to 1 hour depending on the channel, where the raw data was in a long format where each observation contained a well ID, time stamp, channel type, and value. The raw data in the fifteen channels of the ESP data logs can contain information measured by surface sensors over time (such as variable speed drive frequency, current, voltage, etc. over time) and information measured by downhole sensors over time (such as intake pressure, discharge pressure, motor temperature, current, vibration, etc.). In this example, data preprocessing can be performed to condition the raw data into a model-ready format. Such conditioning can include: filtering outliers using rule-based criteria; creating a time grid to index and synchronize the data recorded at different intervals; and inputting data for missing channels with customized rules (e.g., interpolation of missing time series, maximum missing interval not exceeding the specified threshold).

Next, a tagging process can be performed that assigns labels to the portion of the data set that can be considered "healthy" to train the ML model. To accomplish this tagging process, the ESP log data can be processed by assigning a window of a fixed number of days before and after each event. The events can include not only failures but also other types of operational events that can affect ESP operating conditions (e.g., electrical issues, gas coning, preventive maintenance). The portion of the window prior to the event defines a zone of influence where the precursors to the event may be observable. The portion of the window after the event accounts for any inaccuracies in reported failure time and any potential changes in ESP behavior right after the event. The log data within each one of these windows can be tagged with appropriate label data and excluded from the data set. The remainder of the ESP log data can then be extracted as time-series operational data related to healthy ESP operation and included in the training data set for the ML model.

Once the KPIs had been identified, sliding windows can be defined and used to calculate feature data (e.g., mean, variance, and coefficient of variation) that captures temporal characteristics of the time-series operational data in the training set. Small and large window sizes can be used to represent the short-term and long-term trends (i.e., short, and long loops) that would be typically observed in the time-series operational data of the training set. The feature data can be combined with KPI values extracted or calculated from corresponding windows that lag the feature data at some predetermined time offset in the time-series operational data of the training set. For example, the feature data calculated from a sliding window at time 't' can be combined with one or more KPI values derived from the window at time 't+delta (t)'. The feature data and the corresponding KPI values can be used to train the ML model with autoregressive characteristics. Multiple ML models (which include both a random forest model and an artificial neural network model) can be trained to predict the values of the target KPIs for healthy operation of an ESP. In the representative example, the random forest model was found to give slightly better accuracy than the artificial neural network model and therefore was selected as the machine learning algorithm of choice.

FIG. 4 includes a number of plots illustrating results generated by a ML model trained according to the workflow of FIG. 2 for a designated KPI. The training portion is the dataset that was tagged as normal or healthy. The validate portion is the dataset that was excluded from the training. The top plot of FIG. 4 labeled "KPI-1" shows the values of the observed KPI over time as extracted or calculated from the ESP log data as well as the values of the target KPI predicted by the ML model over time. Under normal and healthy operation of the ESP, one would expect to see these two values correlate well. The residuals calculated from the difference between these two values over time is shown in the middle plot of FIG. 4. The residuals are shown as normalized values in the bottom plot of FIG. 4 along with the "anomaly" events (vertical dash lines) detected by the workflow reported. The vertical solid line indicates the reported ESP failure.

The thresholds used for anomaly detection can be tuned to provide an acceptable balance between the true positive rates (TPR) and false-positive rates (FPR). With lower thresholds, the ML model will produce higher detection but also a potential for higher false alarms and vice versa for higher thresholds. In general, if the operator has limited resources, it may be desirable to keep higher thresholds to reduce the number of false alarms that require attention. However, if the opportunity cost from ESP failure is justifiable, it may be more desirable to keep the thresholds lower to ensure that all the potential alarms that can lead to ESP failure are captured.

The table of FIG. 5 shows the effects of varying the threshold for KPI-1 used in anomaly detection on TPR and FPR. The F1 score is the harmonic mean between FPR and TPR.

To improve the performance of the ML model, additional KPIs can be identified, the ML models trained to predict the additional target KPIs, and the corresponding thresholds for anomaly detection can be tuned to find an acceptable level of detection performance. To illustrate these steps, the table of FIG. 6 shows the example of the detection performance using two KPI signals instead of a single KPI. In this case, the ML model can still retain high TPR in the range of 76-80% while reducing FPR and improving the F1 score overall.

To further improve the ML model, additional KPIs can be vetted and fused in a similar manner to provide a better aggregate predictive signal. For example, KPIs can be combined with the details from the pull-out report to build a reasoning model to provide root cause analysis of the failure and suggest any preventive and/or remedial actions for the identified anomaly.

Figure 7:
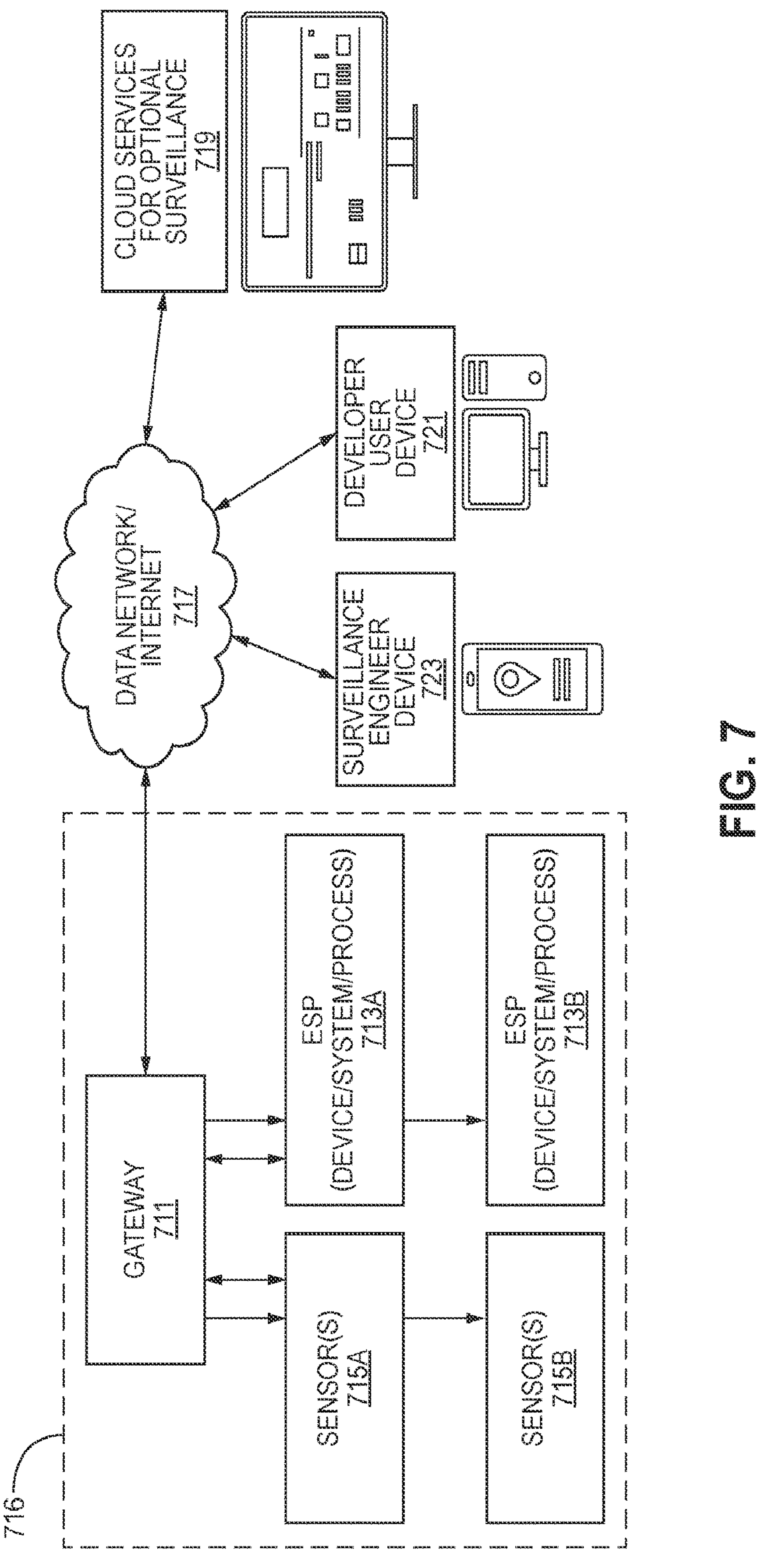
FIG. 7 is a schematic diagram illustrating a distributed computing platform for operational surveillance of one or more ESPs.

In embodiments, the methods, systems, and workflows described herein can employ a distributed computing platform for operational surveillance of one or more ESPs (for example, two ESPs labeled 713A, 713B) as shown in FIG. 7. The ESPs 713A, 713B are located at one or more wellsites or wells 716 that produce hydrocarbons (e.g., petroleum fluids) from subsurface earth formations. The distributed computing platform includes a gateway device 711 that is located at or near the wellsite(s) 716. The gateway device 711 interfaces to the ESPs 713A, 713B and to one or more sensors 715A, 715B that performs measurements that characterize the operation of the corresponding ESPs 713A, 713B. Sensor data output by such sensor(s) 715A, 715B can be collected and/or aggregated and/or otherwise processed by the gateway 711 in real-time. The sensor data collected and/or aggregated and/or otherwise processed by the gateway 711 can be communicated over a data network 717 to cloud services 719, which employ a cloud computing environment that receives such data and processes such data to monitor operating conditions and status of the ESPs 713A, 713B. The data communication network 717 can be a cellular data network, satellite link, the internet, or other modes of data communication.

The cloud services 719 include services that monitor operating conditions and status of the ESPs 713A, 713B, which is referred to as operational surveillance of such ESPs. Such services are typically embodied by software executing in a computing environment, such as a cloud computing environment. An example computing environment is described below with respect to FIG. 8. In this environment, the gateway 711 collects time-series data (e.g., high frequency real-time operational data) that characterizes the operation of the ESPs 713A, 713B and forwards such times-series data to the cloud services 719. The applications deployed or installed on the cloud service 719 can employ a machine learning system or model that is trained using the methods and systems and workflows as described herein to predict one or more target KPIs from the time-series data (e.g., high frequency real-time operational data) received by the cloud services 719 and to detect anomalies in the operation of the ESPs 713A, 713B from differences between the predicted target KPIs and corresponding observed KPIs. One or more developer users can interface to the cloud services 719 employing device(s) 721 that communicate with the cloud services 719 over the data network 717. The device(s) 721 can be a personal computer, portable computer such as a laptop or tablet, a smart phone or other suitable communication or computing device as described below with respect to FIG. 8. Through operation of the developer user device(s) 721 in communication with the cloud services 719, the developer users can assist in configuration and training of the machine learning model or system using the methods and systems and workflows as described herein. In response to the detected anomalies and/or to alerts or alarms corresponding to such anomalies, the ESPs 713A, 713B can possibly be controlled remotely by commands issued by the cloud services 719 or by another system and/or from commands issued by autonomous control operations performed by the gateway 711. Furthermore, the cloud services 719 can be configured to notify one or more users (who are referred to as "surveillance engineers" herein and can be one or more engineers or other users responsible for monitoring and managing the operation of the ESPs 713A, 713B). For example, the surveillance engineer(s) can be notified by messaging (e.g., email messaging or in-app messaging) and/or by presentation and display of an alert or alarm or other visual or multimedia representation corresponding to a detected anomaly event. Such messaging can relate to repair and maintenance of the ESPs 713A, 713B where appropriate. To support notification of surveillance engineer(s), the surveillance engineer(s) can interface to the cloud services 719 employing device(s) 723 that communicate with the cloud services 719 over the data network 717. The surveillance engineer device(s) 723 can be a personal computer, portable computer such as a laptop or tablet, a smart phone or other suitable communication or computing device as described below with respect to FIG. 8.

In embodiments, the gateway device 711 can include applications that monitor operating conditions and status of the ESPs 713A, 713B, which is referred to as operational surveillance of such ESPs. Such applications are typically embodied by software executing in a computing environment. In this environment, the applications of the gateway 711 collects time-series data (e.g., high frequency real-time operational data) that characterizes operation of the ESPs 713A, 713B. The applications deployed or installed on the gateway device 711 can employ a machine learning system that is trained using the methods and systems as described herein to predict one or more target KPIs from the time-series data (e.g., real-time operational data) collected by the ESP and to detect anomalies in the operation of the ESPs 713A, 713B from differences between the predicted target KPIs and corresponding observed KPIs. In response to the detected anomalies and/or to alerts or alarms corresponding to such detected anomalies, the ESPs 713A, 713B can possibly be controlled by commands issued from autonomous control operations performed by the gateway 711 or controlled remotely by commands issued by the cloud services 719 or by another system. Furthermore, the gateway 711 (or the cloud services 719) can be configured to notify one or more surveillance engineers of the detected anomalies. For example, the surveillance engineer(s) can be notified by messaging (e.g., email messaging or in-app messaging) and/or by presentation and display of an alert or alarm or other visual or multimedia representation corresponding to a detected anomaly event. Such messaging can relate to repair and maintenance of the ESPs 713A, 713B where appropriate.

Figure 8:
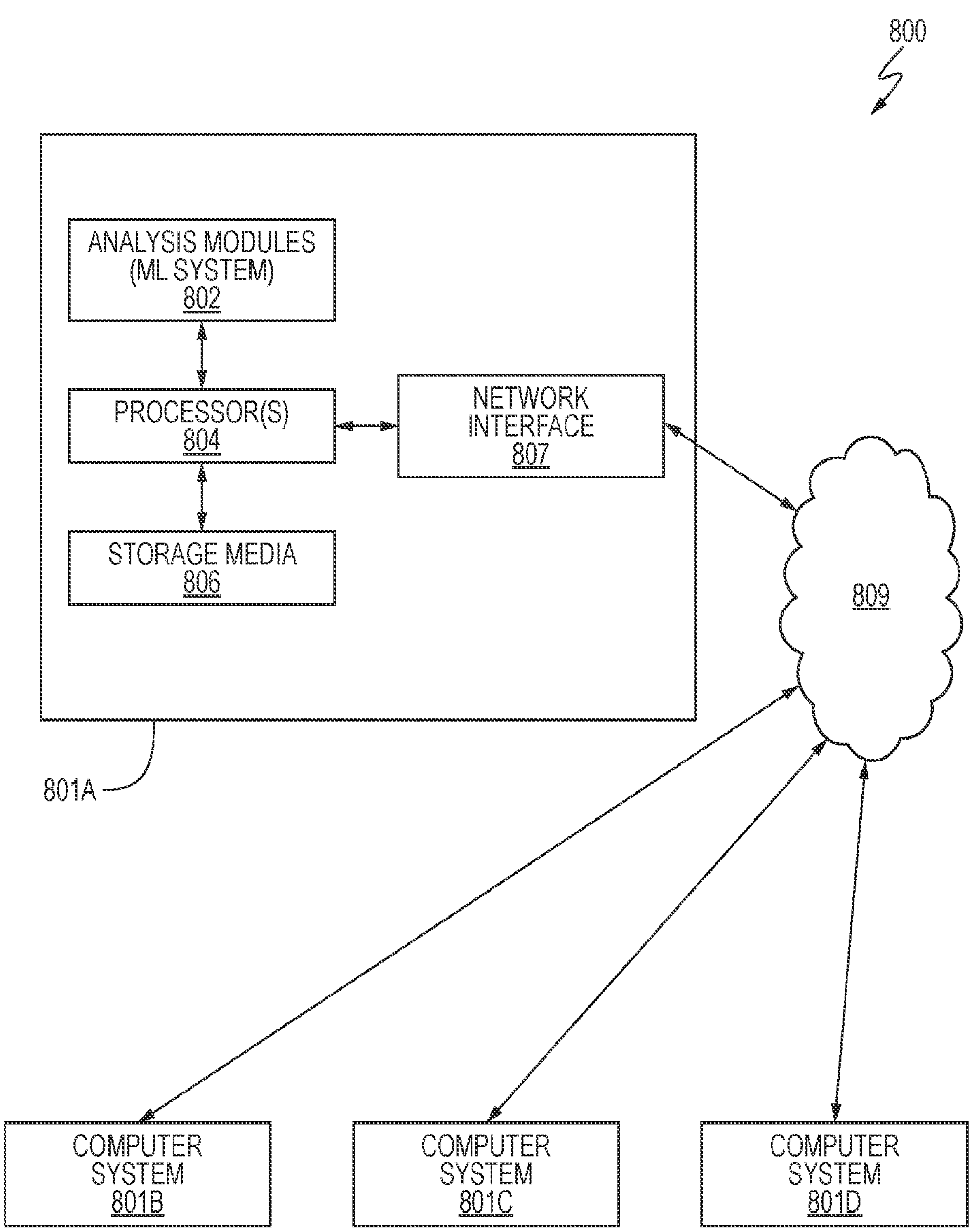
FIG. 8 depicts an example computing environment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods or portions thereof as disclosed herein. To perform these various tasks, the analysis module(s) 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D. Note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions or located at a remote site from which machine-readable instructions may be downloaded over a network for execution.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application-specific integrated circuits.

Further, the steps in the processing methods and workflows described herein may be implemented by running one or more functional modules in information processing apparatus such as general-purpose processors or application-specific chips, such as ASICs, FPGAs, PLDs, or other appropriate devices. These modules, combinations of these modules, and/or their combination with general hardware are all included within the scope of protection of the invention.

In embodiments, the machine learning model or system that performs the operational surveillance of one or more ESPs may be refined in an iterative fashion; this concept is applicable to the methods discussed herein. This may include use of feedback loops executed on an algorithmic basis, such as a computing device (e.g., computing system 800, FIG. 8, and/or through manual control by a user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

In this disclosure, an anomaly detection system is provided where domain-specific health signals are identified, and a machine learning algorithm is used to train a ML model to learn the ESP behavior under normal healthy operating conditions. The learned ML model is used to generate predictions of baseline health signal conditions which are then compared with incoming health signals of an operating ESP. The magnitude of the residuals between the actual and the predicted baseline conditions indicates the degree of anomaly. Historical ESP failure data was used to tune the ML model and benchmark the model performance. The health signals can be chosen using both domain knowledge and a data-driven approach. The predictive performance of each health signal can be evaluated using precision-recall curves. We also illustrated how multiple health signals can be fused and tuned to achieve desired detection characteristics.

In this disclosure, an anomaly detection system for ESPs is provided that uses a ML approach. Once supplied with domain inputs, the system adopts a data-driven approach and works itself in identifying anomalies. It is expected that this can tremendously reduce the workload on engineers by raising alarms only when significant anomalies are detected. Knowledge of potential failures with sufficient lead time will enable the asset team to proactively prioritize the resources, minimize downtime and be better prepared for maintenance logistics.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for monitoring operation or status of an electrical submersible pump (ESP), the method comprising:

a) collecting historical time-series data related to operation of a target ESP;

b) extracting historical time-series data related to healthy operation of the target ESP from the historical time-series data of a);

c) extracting feature data from the historical time-series data extracted in b);

d) extracting or calculating values of at least one key performance indicator (KPI) related to healthy operation of the target ESP from the historical times-series data extracted in b), the at least one KPI being specific to the target ESP;

e) using the feature data of c) and the values of at least one KPI of d) to train a machine learning (ML) model to predict at least one target KPI related to healthy operation of the target ESP given the feature data as input; and f) using the ML model trained in e) to monitor operation or status of the target ESP.

2. The method of claim 1, wherein f) further comprises:

i) receiving or collecting real-time time-series operational data related to operation of the target ESP;

ii) extracting feature data from the real-time time-series operational data of i);

iii) using the ML model trained in e) to predict the at least one target KPI related to healthy operation of the target ESP given the feature data extracted in ii);

iv) extracting or calculating values of at least one observed KPI from the real-time time-series operational data of i);

v) calculating at least one residual based on a difference between the at least one observed KPI and corresponding target KPI predicted by the ML model; and vi) evaluating the at least one residual to detect an event related to the operation of the target ESP.

3. The method of claim 2, wherein:

the values of at least one KPI of d) relate to particular channels in the historical time-series data extracted in b) or calculated variables derived from such data or a combination of both; and the values of the at least one observed KPI of iv) relate to particular channels in the real-time time-series operational data of i), or calculated variables derived from the real-time time-series operational data, or a combination of both.

4. The method of claim 2, wherein:

the feature data of c) capture temporal characteristics of the historical time-series data extracted in b); and the feature data of ii) captures temporal characteristics of the real-time time-series operational data of i).

5. The method of claim 4, wherein:

the feature data of c) is derived by calculating statistics of the historical time-series data extracted in b) within sliding time windows; and the feature data of ii) is derived by calculating statistics of the real-time time-series operational data of i) within sliding time windows.

6. The method of claim 2, wherein the at least one residual of v) can infer an anomaly in the operation or status of an ESP that leads to ESP failure or other operational event to support predictive anomaly detection for the target ESP.

7. The method of claim 1, wherein the ML model is trained in e) to predict a plurality of target KPIs related to healthy operation of the target ESP given the feature data as input.

8. The method of claim 7, wherein;

v) involves calculating a plurality of residuals based on differences between a plurality of observed KPIs and the plurality of target KPIs predicted by the trained ML model; and the plurality of residuals can infer an anomaly in the operation or status of an ESP that leads to ESP failure or other operational event to support predictive anomaly detection for the target ESP.

9. The method of claim 7, wherein two or more target KPIs predicted by the trained ML model are fused together for anomaly detection.

10. The method of claim 2, wherein vi) employs at least one threshold value for evaluating the at least one residual.

11. The method of claim 1, further comprising repeating the operations of d) and e) in an iterative fashion to update KPIs or other system parameters and generate the ML model used in f).

12. The method of claim 2, further comprising alerting a user of the event detected in vi).

13. The method of claim 12, wherein the alert is communicated visually to the user.

14. The method of claim 1, wherein;

f) further comprises deploying or installing the ML model trained in e) to a cloud computing environment that communicates with a gateway located at or near a wellsite; and the gateway is configured to;

collect real-time operational data related to operation of the target ESP, the target ESP comprising at least one ESP located at the wellsite; and forward the real-time operational data to the cloud computing environment.

15. The method of claim 1, wherein;

f) further comprises deploying or installing the ML model trained in e) to a gateway located at or near a wellsite; and the gateway is configured to collect real-time operational data related to operation of the target ESP, the target ESP comprising at least one ESP located at the wellsite.

16. The method of claim 1, wherein some or all of the operations are performed by at least one processor.

17. A system for monitoring operation or status of an electrical submersible pump (ESP), the system comprising at least one processor configured to perform some or all of the operations of claim 1.

18. The method of claim 2, wherein:

the extracting historical time-series data related to healthy operation of the target ESP comprises excluding time windows that are temporally proximate to at least one reported failure event, pullout event, or operational intervention; and the method further comprises using remaining extracted historical time-series data as training data representative of healthy operation.

19. The method of claim 5, wherein:

the sliding time windows include at least:

a small window capturing short-term temporal behavior; and a large window capturing long-term temporal behavior; and feature data from different windows are jointly provided to the ML model.

20. The method of claim 2, further comprising:

logging residuals between observed KPIs and corresponding target KPIs over time; and using the logged residuals to estimate remaining useful life of the target ESP.

21. A system for monitoring operation or status of an electrical submersible pump (ESP) located at a wellsite, the system comprising:

at least one sensor located at the wellsite, the at least one sensor being configured to measure data related to operation of a target ESP; and a gateway device located at or near the wellsite, the gateway device being operably coupled to the at least one sensor, the gateway device being configured to generate or collect or obtain time-series operational data from the data measured by the at least one sensor, wherein the gateway device or a remote system operably coupled to the gateway device is configured to perform operations that characterize operation of the target ESP, and wherein the operations involve;

i) receiving or collecting real-time time-series operational data related to operation of the target ESP, ii) extracting feature data from the real-time time-series operational data of i), iii) using the ML model trained according to claim 1 to predict at least one target KPI related to healthy operation of the target ESP given the feature data extracted in ii), iv) extracting or calculating values of at least one observed KPI from the real-time time-series operational data of i), v) calculating at least one residual based on the difference between the at least one observed KPI and corresponding target KPI predicted by the ML model, and vi) evaluating the at least one residual to detect an event related to the operation of the target ESP.

22. The system of claim 21, wherein:

the remote system is operably coupled to the gateway device and is configured to perform the operations; and the remote system is configured to alert a user of the event detected in vi).

23. The system of claim 21, wherein:

the remote system is operably coupled to the gateway device and is configured to perform the operations; and the remote system comprises a cloud computing environment.

24. The system of claim 21, wherein:

the remote system is operably coupled to the gateway device and is configured to perform the operations; and the remote system comprises a processor programmed by at least one software application.

25. The system of claim 21, wherein the gateway device comprises a processor programmed by at least one software application.

* * * * *